Feb. 1, 1966     H. J. GUGGENHEIM ETAL     3,233,189
LASER UTILIZING RARE EARTH ACTIVATED YTTRIUM AND
LANTHANUM TRIFLUORIDE ACTIVE MEDIA
Filed March 29, 1962
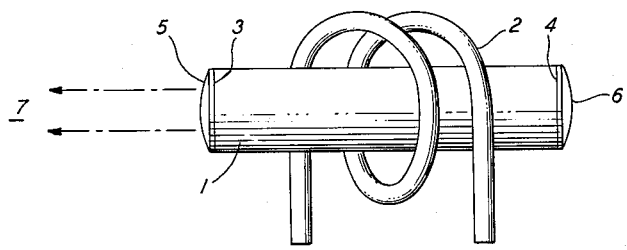
INVENTORS *H. J. GUGGENHEIM*
*L. F. JOHNSON*
BY
*ATTORNEY*

3,233,189
LASER UTILIZING RARE EARTH ACTIVATED YTTRIUM AND LANTHANUM TRIFLUORIDE ACTIVE MEDIA
Howard J. Guggenheim, Somerset, and Leo F. Johnson, Plainfield, N.J., assignors to Bell Telephone Laboratories, Incorporated, New York, N.Y., a corporation of New York
Filed Mar. 29, 1962, Ser. No. 183,561
11 Claims. (Cl. 331—94.5)

This invention relates to optical masers for use in the infared portion of the optical spectrum. The materials of the invention include a trivalent metal fluoride host lattice and additionally contain rare earth ions in the 3+ valence state.

Recently, considerable attention has been focused on a new class of solid state maser devices which are capable of generating or amplifying coherent electromagnetic wave energy in the optical frequency range. Devices of this type, which are described, for example in United States Patent 2,929,922 to Schawlow and Townes, are considered to be operable over the spectral range from far infrared to ultraviolet, an equivalent bandwidth of about $10^{15}$ cycles. Such a bandwidth is capable of providing a great number of new communications channels, thereby multiplying the number of available channels which has heretofore been limited by the characteristics of the heavily used lower frequency portions of the spectrum.

Typically, a maser of the type known in the art employs an active material characterized by a plurality of distinct energy levels, the separation of these levels corresponding to frequencies within the desired operating frequency ranges. More particularly, the separation between two of the energy levels $E_1$ and $E_2$ corresponds to quantized wave energy having a frequency $\nu_{12}$ given by Bohr's equation $$\nu_{12} = \frac{E_2 - E_1}{h}$$

where $h$ is Planck's constant.

In accordance with the maser principle, wave energy in an appropriate frequency range is applied to an ensemble of paramagnetic ions, thereby "pumping" electrons from a lower energy level to a higher level. The excited electrons tend to remain in the upper level for a short time before decaying or relaxing to the lower level. The downward transition is normally accompanied by the radiation of wave energy of the frequency corresponding to separation between the energy levels concerned. During maser operation sufficient pump power is supplied to the active medium to produce, at least intermittently, a non-equilibrium population distribution between the pair of energy levels. More particularly, the population of the upper level is increased with respect to that of the lower level. When the population of the upper level exceeds that of the lower level, a population inversion or negative temperature is considered to obtain. Operation of the maser is dependent upon the fact that a small signal at the proper frequency acts to stimulate the downward transition of the excited electrons from the upper energy level, and that the stimulated emission is coherent and in phase with the signal.

Among the more promising forms of maser are those which utilize an active medium characterized by first, second and third successively higher electron energy levels. Typically, in optical maser materials the upper level is relatively broad, and in some cases is best described as a band. Continuous wave operation of such three-level devices may be achieved, for example, by pumping electrons from the first to the third level from which they relax spontaneously by nonradiative processes, to the second level, thereby producing the desired population inversion between the second and first levels. Advantageously, in masers of this type, the relaxation time between the third and second levels is shorter than that between the second and first levels so that the population of the second level may be continuously maintained during operation of the device. Additionally, as the magnitude of the negative temperature attained depends on the relative populations of the first and second levels, the energy level system of preferred materials also include mechanisms which continuously depopulate the terminal state of the optical transition. Thus, the population inversion is maintained at a relatively high value and maser action is facilitated.

Among the more promising active maser materials are those which comprise a host crystal containing paramagnetic ions from which the stimulated emission occurs. The host crystal must be of a material capable of accepting the paramagnetic ions in such a way that they are able, upon excitation, to fluoresce with good over-all quantum efficiency, with as much as possible of the emitted energy concentrated in a single narrow spectral line.

More particularly, the host must accept the ions in such a way as to minimize coupling between them and the crystal lattice at the maser frequency, while simultaneously permitting relaxation from the pump band to the upper energy level of the signal pair. Additionally, the host crystal should be of good optical quality. That is to say, it must be relatively free of scattering centers and hence transparent to the light waves at the operating frequency of the maser. Furthermore, the host should have a low coefficient of absorption at the pump frequency to minimize heating of the maser medium and to promote more efficient utilization of the pump power. Chemical and physical stability are further desiderata. It is also required that the host be of a mechanically workable material, capable of being accurately shaped and highly polished.

One combination of paramagnetic ions with a host lattice meeting the above-mentioned conditions is ruby, which continues to be widely used as an optical maser medium and is, in fact, one of the relatively few materials which have been operated successfully. Ruby has usable emission lines at .6943 micron and .6921 micron. In addition, ruby having a high concentration of chromium ions is characterized by sharp satellite lines at .7009 micron and .7041 micron. Another successful material, operable at liquid hydrogen temperatures, comprises a calcium fluoride host lattice containing samarium ions. Emission from the samarium ions is at .7082 micron. A more recently discovered optical maser medium, disclosed in copending application Serial No. 139,266, filed September 19, 1961, of Johnson and Nassau, is calcium tungstate containing trivalent neodymium ions. Additional newly discovered materials are disclosed in copending applications Serial Nos. 153,603, 153,604, 153,605, 153,606 and 153,607 all filed on November 20, 1961. These include praseodymium in calcium tungstate operating at about 1.047 microns, thulium in calcium tungstate operating at about 1.91 microns, holmium in calcium tungstate operating at about 2.05 microns, and neodymium in calcium fluoride operating at about 1.05 microns.

Inasmuch as the choice of active medium for an optical maser device governs the frequency of the usable emission lines, it is desirable to provide a variety of optical maser materials in order to make possible the generation and amplification of coherent light beams over the wider range of the optical frequency spectrum.

An object of the invention is the generation and amplification of coherent radiation in the optical frequency spectrum.

A feature of the invention is an optical maser having an active medium consisting of trivalent paramagnetic ions in a trivalent host lattice.

In accordance with the invention, it has been discovered that trivalent metal fluoride compositions of matter provide favorable crystalline host lattices for paramagnetic ions useful as optical maser media. For example, one host lattice of the invention comprises lanthanum trifluoride which has a noncubic crystalline lattice of the hexagonal type. Yttrium trifluoride also has advantageous properties as a host lattice. Paramagnetic ions exhibiting favorable characteristics in such lattices include the trivalent ions of the rare earths praseodymium, neodymium, samarium, europium, terbium, holmium, erbium, thulium, and ytterbium. In addition to ions of other rare earths, trivalent uranium is included in the class of ions which may be associated with the trifluoride host lattices.

Priorly known solid state optical maser media have included trivalent rare earth ions in host lattices of divalent metal tungstates and fluorides or divalent metal molybdates, among others. As the trivalent rare earth ions enter such host lattices in place of the divalent metal ions, some form of charge compensation is required. This may take the form, for example, of vacancies at other sites within the lattice, or of the inclusion of interstitial ions of other elements. In general, it may be said that charge compensation causes perturbations in the crystalline fields acting on the fluorescent ions. As a result, the fluorescent spectra are complicated by emission at many different wavelengths not normally present in the spectra of ions in a more uniform lattice environment.

The use of a trivalent host lattice for trivalent fluorescent ions results in a simpler emission spectrum with a possibility of greater intensity in particular lines and increased efficiency in the use of pump energy. A contributing factor to the spectral improvement produced by the invention is that the ionic radii of lanthanum and yttrium are quite similar to those of the rare earths. Thus the crystalline lattice accepts the impurity ions without undesirable distortions and perturbations.

An optical maser following the principles of the invention is shown in the figure. There is depicted a rod-shaped crystal 1 of a trivalent host lattice having an appropriate concentration of trivalent paramagnetic ions as disclosed herein. Pump energy is supplied by a helical lamp 2 encompassing rod 1 and connected to an energy source not shown. Ends 3 and 4 of rod 1 are ground and polished in the form of confocal spherical surfaces. Reflective layers 5 and 6 are deposited on ends 3 and 4, thereby forming an optical cavity resonator of the type described in a copending patent application Serial No. 61,205, filed October 7, 1960, by Boyd, Fox and Li, now United States Patent No. 3,055,257, issued September 25, 1962. Advantageously, layer 6 is totally reflecting while layer 5 includes at least a portion which is only partially reflected to permit the escape of coherent radiation 7 having a wavelength in the optical range. If desired, rod 1 during operation may be maintained in a bath of a liquified gas such as nitrogen, to maintain a very low temperature. Cooling the crystal tends to reduce the populations of energy levels above the ground state. More particularly, the population of the lower level of the maser transition is reduced, thereby enhancing the negative temperature condition.

The lamp 2 is advantageously of a type which produces intense radiation over a broad band extending from .4 micron to longer wavelengths. Mercury or xenon lamps are considered useful to pump the materials of the invention, which are characterized by a plurality of sharp absorption lines in the specified spectral range. Other types of lamps may, of course, be employed provided they emit sufficient energy at wavelengths corresponding to one or more useful absorption lines of the material. In some cases it is desirable to filter out pump light of wavelengths shorter than about .4 micron. Electrons in the active medium are excited to upper energy levels by the pump power and relax through nonradiative processes to an intermediate level corresponding to one of the $^4F_{3/2}$ levels of, for example, free neodymium ions. This level corresponds to the metastable level of the above-mentioned exemplary three-level system. A negative temperature is thus created between the $^4F_{3/2}$ level and one of the $^4I_{11/2}$ levels. The $^4I_{11/2}$ level lies about 2,000 cm.$^{-1}$ above the ground state and has a negligible population at room temperature. The population of the terminal state may be further reduced by cooling the crystal. Stimulated emission in the infrared is produced by this device.

An optical maser of the type illustrated in the figure has been operated using as an active medium lanthanum trifluoride ($LaF_3$) containing .5 mole percent of neodymium in place of lanthanum. At room temperature this device produced intense coherent emission at 1.0632 microns in the infrared. At liquid nitrogen temperature coherent emission was produced at 1.0399 microns. A second device was operated with an active medium comprising lanthanum trifluoride with about 5 percent neodymium.

Maser action may be achieved over a broad range of paramagnetic ion concentrations. Although in principle there is no lower limit on the impurity concentration which may be employed in the crystal 1, yet a practical limit of about 0.01 percent is imposed by the necessity of having sufficient unpaired electrons available to produce a useful output. The preferred concentration of $Nd^{+3}$ ions in the trifluoride host crystal is deemed to be about 2 percent. Such a concentration appears desirable from the standpoint of maximum intensity in the narrowest possible line. However, useful concentrations are deemed to extend as far as 30 percent. Beyond 30 percent increasing account must be taken of line broadening due to interaction among the neodymium ions themselves. Furthermore, at high concentrations the crystals become quite densely colored so that relatively little pump light penetrates to the interior.

From measurements made on the device described above, it is estimated that, at room temperature, the power required to operate a lanthanum trifluoride neodymium optical maser in accordance with the invention is about 10 percent of that required to operate a ruby maser of similar configuration under the same conditions.

Crystals in accordance with the invention may be grown by a modification of the Bridgman method. According to this technique the material to be crystallized is melted in a crucible placed in a high temperature region of an oven characterized by an appropriate temperature gradient over a usable volume. The crucible is then moved at a controlled rate from the high temperature to a low temperature region. The materials of the invention are advantageously made by carrying out this process in an atmosphere of dry hydrogen fluoride. Lanthanum trifluoride crystals containing neodymium were prepared by mixing $LaF_3$ powder with $NdF_3$ powder in the proportions desired. Thorough mechanical mixing was carried out with a mortar pestle. The mixture was then placed in a platinum crucible which was sealed by welding on a top provided with tubulations for the circulation of HF gas. The crucible was then placed in an oven and heated to about 1550° C. to melt its contents. This temperature was maintained for about twelve hours, with dry HF being circulated constantly. The crucible was then moved to the cooler zone of the oven (about 1400° C.) where the contents cooled to just below their melting point. Nucleation was aided by a conical point on the bottom of the crucible. After remaining at this temperature for 24–48 hours, the crystals were then cooled to room temperature at a rate of about 25° per hour. Modifications of the crystal growing process are of course possible. The starting materials, for instance, may be oxides instead of fluorides. Temperatures and rates of cooling may be varied from those given in the example to match the particular requirements of the trifluoride-rare earth combination to be crystallized.

Although the invention has been described with reference to a specific embodiment, this is to be construed by way of illustration and does not limit the scope of the invention. For example, the material may be used in optical cavity resonators other than the confocal type. The parallel plate resonator, as well as others, may also be employed. Other variations are also possible within the spirit of the invention.

What is claimed is:

1. An optical maser comprising an active medium consisting essentially of a substantially monocrystalline-trivalent metal fluoride host lattice selected from the group consisting of lanthanum trifluoride and yttrium trifluoride in which from about .01 percent to about 30 percent of the trivalent metal ions have been replaced by trivalent rare earth fluorescent ions, pumping means for establishing a negative temperature state between a pair of optically connected energy levels of said rare earth ions, and means for stimulating coherent emission at the wavelength corresponding to the separation of said levels.

2. An optical maser as claimed in claim 1 wherein said fluorescent ion is neodymium.

3. An optical maser as claimed in claim 1 wherein said fluorescent ion is praseodymium.

4. An optical maser as claimed in claim 1 wherein said fluorescent ion is samarium.

5. An optical maser as claimed in claim 1 wherein said fluorescent ion is europium.

6. An optical maser as claimed in claim 1 wherein said fluorescent ion is terbium.

7. An optical maser as claimed in claim 1 wherein said fluorescent ion is holmium.

8. An optical maser as claimed in claim 1 wherein said fluorescent ion is erbium.

9. An optical maser as claimed in claim 1 wherein said fluorescent ion is thulium.

10. An optical maser as claimed in claim 1 wherein said fluorescent ion is ytterbium.

11. An optical maser comprising an active medium consisting essentially of a substantially monocrystalline trivalent metal fluoride host lattice selected from the group consisting of lanthanum trifluoride and yttrium trifluoride in which from about .01 percent to about 30 percent of the trivalent metal ions have been replaced by trivalent uranium fluorescent ions, pumping means for establishing a negative temperature state between a pair of optically connected energy levels of said uranium ions, and means for stimulating coherent emission at the wavelength corresponding to the separation of said levels.

References Cited by the Examiner

UNITED STATES PATENTS 2,929,922   3/1960   Schawlow et al. _____ 88—1

OTHER REFERENCES

Kroger: "Some Aspects of the Luminescence of Solids," Elsevier Publishing Co., Inc., New York, 1948, pages 288, 292, 294, and 296.

TOBIAS E. LEVOW, *Primary Examiner.*

MAURICE A. BRINDISI, *Examiner.*